W. H. MAPLE.
Car-Coupling.

No. 215,644.  Patented May 20, 1879.

WITNESSES:
W. W. Hollingsworth

INVENTOR:
Wm H Maple

UNITED STATES PATENT OFFICE.

WILLIAM H. MAPLE, OF CHARITON, IOWA.

IMPROVEMENT IN CAR-COUPLINGS.

Specification forming part of Letters Patent No. 215,644, dated May 20, 1879; application filed March 6, 1879.

*To all whom it may concern:*

Be it known that I, WILLIAM H. MAPLE, of Chariton, in the county of Lucas and State of Iowa, have invented a new and Improved Car-Coupling; and I do hereby declare that the following is a full, clear, and exact description of the same, reference being had to the accompanying drawings, forming part of this specification, in which—

Figure 1:
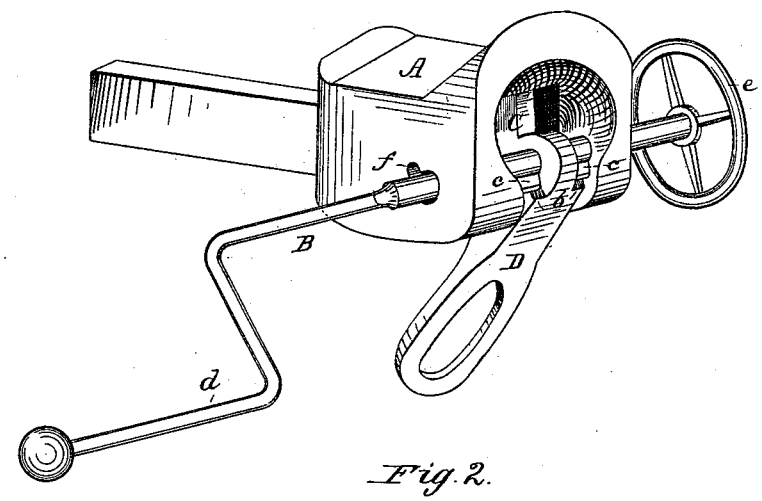
Figure 2:
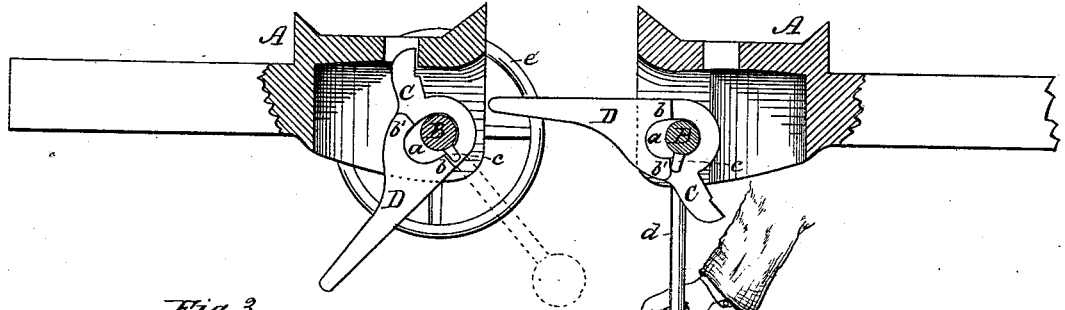
Figure 3:
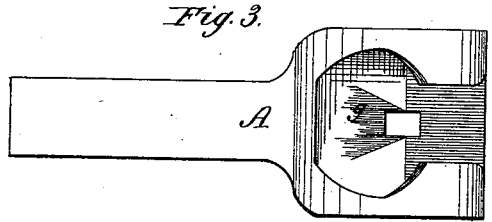
Figure 4:
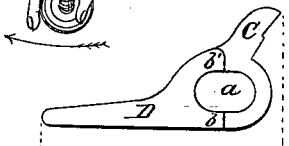
Figure 5:
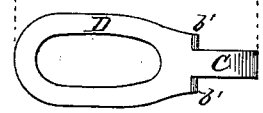
Figure 5:
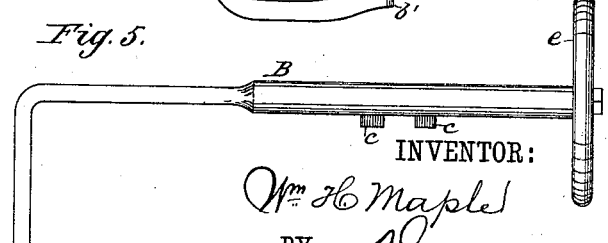

Figure 1 is a perspective view. Fig. 2 is a side view with the two adjacent draw-heads in section. In this view the combined pin and link in the left-hand draw-head stands in position in which the pin end forms a self-coupling pin, while the other portion of the view on the right shows the same devices with the link extended for coupling. Fig. 3 is a bottom or inverted plan view of draw-head, showing link-chamber and perforation through top, with its flaring sides intended to guide pin end into its proper bearing, and also to admit a common pin just behind the lateral shaft, which becomes its lower bearing when it is necessary to use the common pin, (as in case of breakage.) Fig. 4 represents detail views of the combined link and pin, showing the oblong opening for shaft-lugs, &c. Fig. 5 is a detail of the horizontal rock-shaft with its weighted handle (which may be a ball or extended handle) and hand-wheel, also the lugs for the movement of the link and pin.

My invention relates to certain improvements upon that general form of car-coupling in which a combined link and pin is pivoted in an open-bottom draw-head, so as to be turned on its pivotal connection, and be used either as a link or pin, as may be desired.

My invention consists in the improved construction of the combined link and pin, the draw-head, and the horizontal shaft for connecting the two, and in the arrangement of these parts, as hereinafter fully described, and pointed out in the claims.

In the drawings, A represents the draw-head, which is formed with closed top and sides and an entirely open bottom. B is the horizontal shaft arranged in bearings in the lower sides of the draw-head, which sides at these points are enlarged or thickened for greater strength. C D is the combined pin and link, made in one piece, and provided with an elongated perforation or slot, *a*, whose length or greater axis is at an angle to the pin end C, for the reasons hereinafter explained. This combined pin and link is formed around the slot with lugs *b b*, and also with opposite or diametrical lugs *b' b'*. The shaft B, which passes through the slot in C D, is also provided with lugs *c c*. The shaft B has also at one end a handle, *d*, bent or cranked, so as to form a weight that tends always by gravitating to hold the shaft in a certain position. Upon the opposite end of the shaft is a hand-wheel, *e*, by which or the handle *d*, as the case may be, the shaft is manipulated. Now, when the shaft is turned to the position indicated by the left-hand portion of Fig. 2, the lugs *c c* of the shaft rest upon lugs *b b* of the combined pin and link, and the pin end C seats itself against a bearing in the top or roof of the draw-head, being guided to its place by the tapering channel *g*. (See Fig. 3.)

When the handle *d* is thrown over to the rear, the shaft is revolved so that its lugs *c c* rest upon the lugs *b' b'* of the link and pin C D, holding the link forward ready to be raised to the proper height to enter the adjacent draw-head by pressing against the handle *d*. Now, when the handle is thus pressed forward, the device assumes the position shown in right portion of Fig. 2. Now, in this position, if the draw-head is brought against the opposing draw-head, the projected link pushes the pin end of the device on the other car to the rear against the gravity of the handle, and the coupling is automatically effected, as will be seen without further description.

It is obvious that the direction of the projected link may be controlled and its position steadied by hand through the handles upon either side without the necessity of going between the cars.

If this device comes into contact with any of the common draw-heads, to effect the coupling it is only necessary to take hold of the handle, and by pressing it forward the link is raised to the desired height to enter such draw-head, where it is secured by means of a common pin; or, if it is desired, a common link can be inserted in this draw-head around the pin end of combined link and pin, and by pressing the handle it is also guided into the common draw-head.

It will be seen that there are always both a link and pin in each draw-head to be coupled, and that either link may be used at the convenience of the operator, the pin end of the other combined link and pin being at all times ready to afford a fastening for the link used.

To insert or take out the shaft, or the combined link and pin, it is only necessary to take off the hand-wheel, which is secured to the end of the shaft by a split key or pin, and turn the shaft until the handle assumes a nearly perpendicular position on the top of the shaft, and lift the link and pin, when the lugs on the shaft will readily pass through the oblong opening in link and through a slotted opening, $f$, Fig. 1, on the right side of the draw-head. Although this shaft is easily inserted or extracted in this manner, yet when in place it cannot get out when in operation.

I will also call attention to the objects or advantages in having the hole in link and pin for shaft made oblong, as represented. This not only admits the lugs of shaft, but when the pin end is used and the draft applied this oblong hole (being in its length at an angle with the pin) causes the pin to be forced up into the hole in top of draw-head, so as to give the pin a better bearing or hold. The third office of this oblong opening is, that it allows the link a longitudinal play when used with the common draw-head, and prevents it from striking the bottom of the link-chamber. In many of these common draw-heads the link-chamber is quite shallow, only allowing a penetration of about seven inches, and bending or breaking by jamming of cars when coupled or in coupling.

With respect to the construction of the combined link and pin, it will be seen that the pin end is set at an angle to the link end. The object of this is as follows: In coupling or uncoupling two cars the pin end must recede to allow the link of the other car to be withdrawn, and as this pin recedes its link end is thrown outwardly toward the opposite car, and if the combined link and pin were straight its lower end would strike the draw-bar of said car and limit the rearward movement of the pin end. By making the parts to set at an angle, as shown, the pin end can move to the rear a considerable distance before the swing of its link end would interfere with the opposing draw-head.

As to the relative position of the lugs and handles of the shaft, these are both arranged on the same side or upon opposite sides of said shaft, so that when the handle is hanging vertically the lugs project either from the top or the bottom of the said shaft, and do not interfere with the free lateral play of the link end when extended.

In defining my invention with greater clearness, I would state that I am aware that a combined link and pin has been loosely pivoted in an open-bottomed draw-head upon a second rear link; but this combined link and pin was straight, was not slotted, had no lugs, and was not combined with a transverse shaft, so as to permit it to be conveniently manipulated. On the other hand, I am aware that a horizontal transverse shaft has been attached rigidly to a combined link and pin in an open-bottom draw-head; but in this case the rigid connection precluded any such adjustments as are shown in my case. I therefore disclaim the constructions referred to.

Having thus described my invention, what I claim as new is—

1. The combined link and pin loosely attached to and combined with an open-bottomed draw-head by means of a transverse shaft having lugs, as and for the purpose set forth.

2. The combination, with an open-bottom draw-head, of a combined link and pin, the pin end of the same being (in its length) set at an angle to the link end, as shown, to allow the pin end (when filling the office of a pin) to be disengaged from the link of the adjacent draw-head before the link end in its swinging movement comes in contact with such adjacent draw-head.

3. The combination, with a coupling device and the draw-head, of a rock-shaft passing transversely through the draw-head, and provided with weighted handles or hand-wheels, arranged as described, so as to afford means for rocking such shaft and exerting a holding effect on the coupling device, and having lugs also for effecting connection between said shaft and coupling device, as shown and described.

4. The rock-shaft extending transversely through a draw-head, and provided with suitable lugs or pins to work against lugs or pins on a coupling link or hook for the purpose of moving the same into a desired position, in combination with a link or other connecting device provided with corresponding lugs or pins, as shown and described.

5. The combined link and pin provided with lugs and with an oblong opening, in combination with the transverse shaft having similar lugs, whereby the lugs on the shaft are permitted to pass through such link, and whereby, also, side and longitudinal play is permitted for such link, as set forth.

6. The rock-shaft provided with lugs, as shown, for the purpose of preventing such shaft from moving endwise in the draw-head when the shaft is in place, combined with the draw-head, as shown and described.

7. The combination, with a draw-head and coupling device, of the transverse rock-shaft provided with handles and lugs for operating the coupling device, the said lugs and handles being secured to the same or opposite sides of said shaft, so that when in operation, and the handles are hanging perpendicularly, the lugs will be on or near the bottom or top of such shaft, so as not to prevent the lateral play of the front end of the link.

8. The combination, with the shaft having lugs, as described, of the draw-head having slots *f* leading into the bearing for said shaft, so as to give passage to the lugs in the insertion of the shaft, as set forth.

9. A coupling-link loosely coupled to and combined with an open-bottomed draw-head by means of a transverse shaft having lugs, as described.

10. A transverse rock-shaft with weighted handles and lugs, as described, in combination with a link having corresponding lugs, by which such link is moved into the desired position.

11. The open-bottomed draw-head having its roof or top portion constructed, as described, with a flaring opening or hold for the pin end, by which the pin is guided into its proper rest or hold, and prevented from playing from side to side when draft is applied thereto.

12. The link and pin having an oblong hole arranged at an angle to the pin end, so as to force the pin farther into its seat when draft is applied, substantially as shown and described.

WILLIAM H. MAPLE.

Witnesses:
L. F. MAPLE,
B. R. VAN DYKE.